United States Patent

(12) United States Patent
Yang et al.

(10) Patent No.: US 9,024,607 B2
(45) Date of Patent: *May 5, 2015

(54) CONTROL CIRCUIT FOR POWER CONVERTER AND METHOD THEREOF

(71) Applicant: Richtek Technology Corporation, Hsinchu County (TW)

(72) Inventors: Tsung-Hsi Yang, New Taipei (TW); Isaac Y. Chen, Hsinchu County (TW); Chien-Fu Tang, Hsinchu (TW); Jiun-Hung Pan, Taipei (TW)

(73) Assignee: Richtek Technology Corporation, Zhubei (TW)

( * ) Notice: Subject to any disclaimer, the term of this patent is extended or adjusted under 35 U.S.C. 154(b) by 177 days.

This patent is subject to a terminal disclaimer.

(21) Appl. No.: 13/789,287

(22) Filed: Mar. 7, 2013

(65) Prior Publication Data

US 2013/0235633 A1  Sep. 12, 2013

(30) Foreign Application Priority Data

Mar. 7, 2012 (TW) .............................. 101107786 A

(51) Int. Cl.
*H02M 3/157* (2006.01)
*H02M 7/06* (2006.01)
*H02M 3/156* (2006.01)
*H02M 1/42* (2007.01)

(52) U.S. Cl.
CPC .............. *H02M 7/06* (2013.01); *H02M 1/4225* (2013.01); *H02M 3/156* (2013.01); *Y02B 70/126* (2013.01)

(58) Field of Classification Search
CPC ........ H02M 3/156; H02M 3/157; H02M 7/06

USPC ................... 323/283; 363/147; 700/297, 298; 327/538, 540
See application file for complete search history.

(56) References Cited

U.S. PATENT DOCUMENTS

| 7,098,632 | B2 * | 8/2006 | Chen et al. ..................... 323/222 |
| 7,315,190 | B1 | 1/2008 | Chen |
| 7,471,072 | B2 | 12/2008 | Fogg et al. |
| 8,305,063 | B2 * | 11/2012 | Wang et al. .................... 323/283 |
| 8,305,070 | B2 * | 11/2012 | Vulih et al. .................... 323/318 |
| 8,416,596 | B2 | 4/2013 | Huang |
| 8,704,590 | B2 * | 4/2014 | Lai et al. ........................ 327/540 |

(Continued)

FOREIGN PATENT DOCUMENTS

CN  102055357 A  5/2011

*Primary Examiner* — Gary L Laxton
*Assistant Examiner* — Kyle J Moody
(74) *Attorney, Agent, or Firm* — Birch, Stewart, Kolash & Birch, LLP

(57) ABSTRACT

A control circuit for a power converter has a current source, a sampling circuit, a signal processing circuit, a driving circuit, and a shared pin. The shared pin is used for coupling with a resistor and a switch. The current source, coupled with the shared pin, provides a current through the shared pin to the resistor in a first period. The sampling circuit, coupled with the shared pin, samples signals on the shared pin for generating a first sampling value and a second sampling value. The signal processing circuit, coupled with the sampling circuit, compares the first sampling value and the second sampling value. The driving circuit generates driving signals for conducting the switch. When the difference of the first sampling value and the second sampling value is less than a predetermined value, the signal processing circuit configures the driving circuit to intermittently conduct the switch in a second period.

10 Claims, 6 Drawing Sheets

(56) References Cited

U.S. PATENT DOCUMENTS

| | | | |
|---|---|---|---|
| 8,717,091 B2 * | 5/2014 | Lai et al. | 327/540 |
| 8,816,746 B2 * | 8/2014 | Wen et al. | 327/306 |
| 2012/0287682 A1 * | 11/2012 | Zhang et al. | 363/21.16 |
| 2014/0226372 A1 * | 8/2014 | Tang et al. | 363/21.18 |

* cited by examiner

US 9,024,607 B2

CONTROL CIRCUIT FOR POWER CONVERTER AND METHOD THEREOF

CROSS-REFERENCE TO RELATED APPLICATIONS

This application claims the benefit of priority to Taiwanese Patent Application No. 101107786, filed on Mar. 7, 2012; the entirety of which is incorporated herein by reference for all purposes.

BACKGROUND

The present disclosure generally relates to a control circuit for a power converter and, more particularly, to the control circuit with a reduced number of package pins.

With the progress of the technology, electronic elements may be downsized to fit in the limited space of the electronic devices. For example, the integrated circuit (IC) element is frequently utilized in the electronic devices and comprises a die encapsulated by a package. The IC element usually needs to be coupled with many electronic elements through the package pins, and therefore a large-size package is usually needed for accommodating the required number of the package pins. In this situation, the die size is usually much smaller than the size of the package. Not only the wasted package materials result in environmental issues, but also the dimensions of the IC elements may not be reduced effectively.

In the field of power converters, e.g., AC to DC (AC-DC) power converters and DC to DC (DC-DC) power converter, when the control circuit of the power converter is realized with an IC element, the die size of the control circuit is usually small compared with the size of the package. The control circuit, however, needs a plurality of pins to be coupled with other circuit elements, to configure the power stage circuit of the power converter, to receive feedback signals, to receive operation parameters, etc. The package encapsulating the die of the control circuit must have enough pins, which are usually accompanied with the increase in the package size. The design flexibility is therefore constrained.

Some try to reduce the required pin numbers and the package size of the IC elements by utilizing one or more shared pins. Because the characteristics of IC elements are different, there are no clear principles which may be applicable universally. The circuits of the IC element sharing a shared pin must be carefully designed to ensure the correct functionality of the IC element.

SUMMARY

In view of the foregoing, it can be appreciated that a substantial need exists for methods and apparatuses that can mitigate or reduce the problems above.

An example embodiment of a control circuit for a power converter, comprising: a shared pin, for coupling with a resistor and a switch of the power converter; a current source circuit, coupled with the shared pin, for providing a current through the shared pin to the resistor in a first period; a sampling circuit, coupled with the shared pin, for sampling signals on the shared pin in a first interval and a second interval of the first period for generating a first sampling value and a second sampling value; a signal processing circuit, coupled with the sampling circuit, for comparing the first sampling value and the second sampling value; and a driving circuit, coupled with the shared pin, for generating a driving signal to configure a conduction status of the switch through the shared pin; wherein the signal processing circuit configures the driving circuit to intermittently conduct the switch in a second period when a difference between the first sampling value and the second sampling value is less than a predetermined value.

Another example embodiment of a control circuit for a power converter, comprising: a shared pin, for coupling with a switch and a resistor of the power converter; a current source circuit, coupled with a shared pin, for providing a current through the shared pin to the resistor in a first period; a sampling circuit, coupled with the shared pin, for sampling signals on the shared pin; a driving circuit, coupled with the shared pin; and a signal processing circuit, coupled with the driving circuit and the sampling circuit; wherein the driving circuit generates a driving signal in a second period and transmits the driving signal through the shared pin to intermittently conduct the switch in a second period when at least one difference of the signals sampled by the sampling circuit is less than a predetermined value.

Another example embodiment of a control method for a power converter, comprising: coupling a shared pin with a switch and a resistor of the power converter; providing a current through the shared pin to the resistor in a first period; sampling signals on the shared pin in a first interval and a second interval of the first period to generate a first sampling value and a second sampling value; comparing the first sampling value and the second sampling value; and intermittently conducting the switch through the shared pin in a second period when a difference between the first sampling value and the second sampling value is less than a predetermined value.

Another example embodiment of a control method for a power converter, comprising: coupling a shared pin with a switch and a resistor of the power converter; providing a current through the shared pin to the resistor in a first period; sampling signals on the shared pin; and intermittently conducting the switch through the shared pin in a second period when at least one difference of the signals sampled on the shared pin is less than a predetermined value.

It is to be understood that both the foregoing general description and the following detailed description are example and explanatory only and are not restrictive of the invention, as claimed.

All of the drawings are arranged in accordance with at least some embodiments described herein.

DETAILED DESCRIPTION

Reference will now be made in detail to embodiments of the invention, which are illustrated in the accompanying drawings.

Power converters are used as examples below to illustrate the present invention. In the embodiments below, the sampling circuit and the driving circuit of the control circuit of the power converter share a specific pin to effectively minimize the pin number of the package and the package size.

Figure 1:
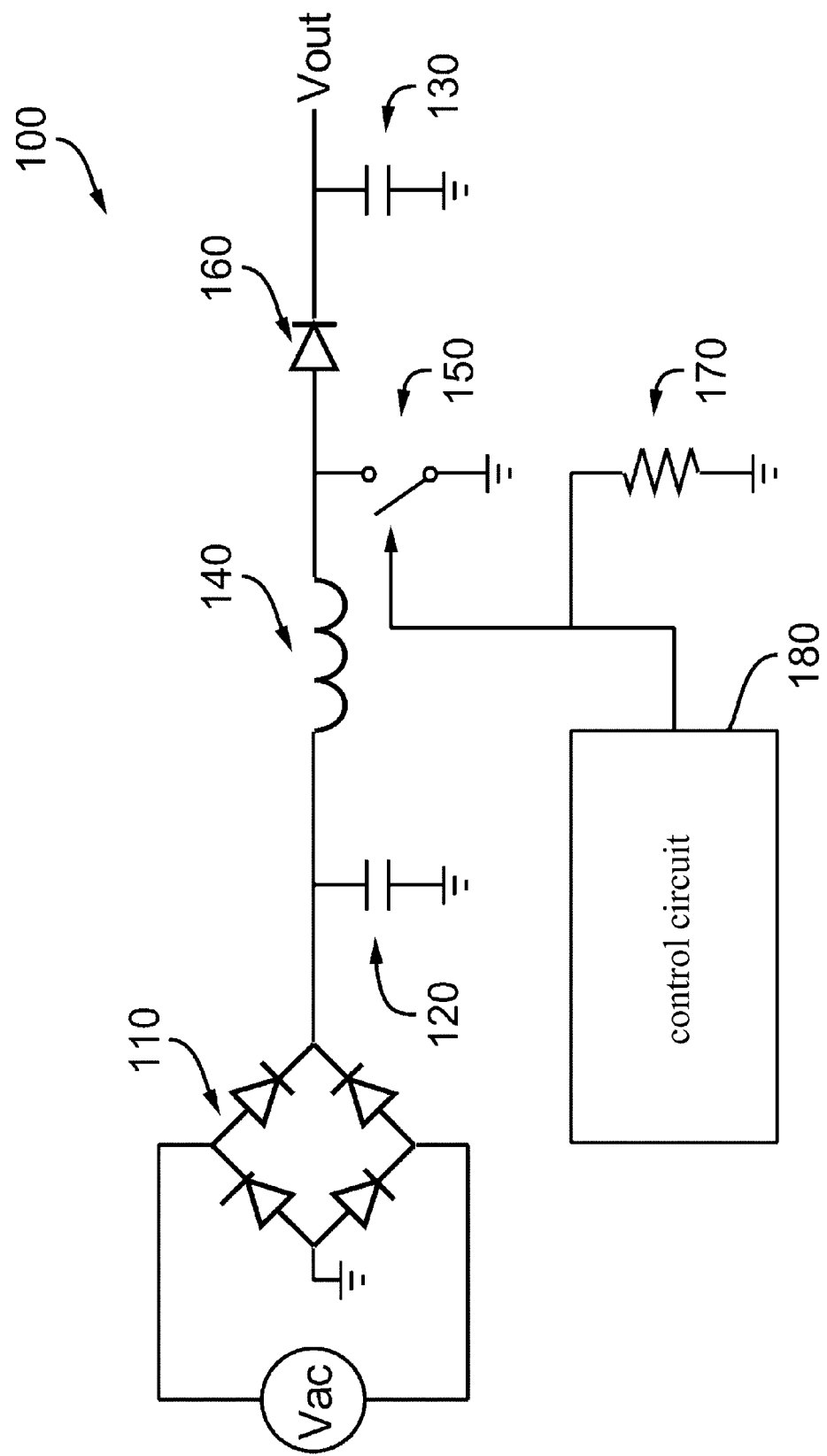
FIG. 1 shows a simplified functional block diagram of an example AC-DC power converter.

FIG. 1 shows a simplified functional block diagram of an example AD-DC power converter 100. The power converter 100 comprises a bridge rectifier 110, capacitors 120 and 130, an inductor 140, a switch 150, a diode 160, a resistor 170, and a control circuit 180. Some components and connections are simplified or omitted in FIG. 1 for the purposes of conciseness and clear explanation.

In this embodiment, the bridge rectifier 110 comprises four diodes for rectifying the AC signals of the AC current source Vac to generate the corresponding DC signals. In other embodiments, the bridge rectifier 110 may also be realized with other suitable structures.

The switch 150 may be realized with the FET, the BJT, other types of transistors, or other types of switches. The control circuit 180 is coupled with the control terminal of the transistor (e.g., the gate of the MOSFET or the base of the BJT) for conducting the switch 150 at appropriate time so that the AC signals of the AC power source Vac may be converted to the required DC signal Vout. In this embodiment, the switch 150 is realized with a transistor for the purpose of clear explanation. In other embodiments, the switch 150 also may be realized with other types of transistors or other types of switches. For example, the switch 150 may also be realized with one or more transistors in combination with other active and/or passive circuit element(s).

The control circuit 180 may configure the conduction status of the switch 150 and configure the operation of the power converter 100 according to the DC signal Vout and/or other signals. For example, the control circuit 180 may be used for configuring the power factor of the power converter 100 or other operations of the power converter 100.

Besides, the control circuit 180 may configure one or more operating parameters of the power converter 100 or configure the operation of other components according to the resistance of the resistor 170. For example, the control circuit 180 may configure the overcurrent protection value according to the resistance of the resistor 170. When the current flowing through the power converter 100 is greater than the overcurrent protection value, the control circuit 180 ceases the operation of one or more components of the power converter 100 or takes suitable measures to prevent from the damage of the power converter 100.

Figure 2:
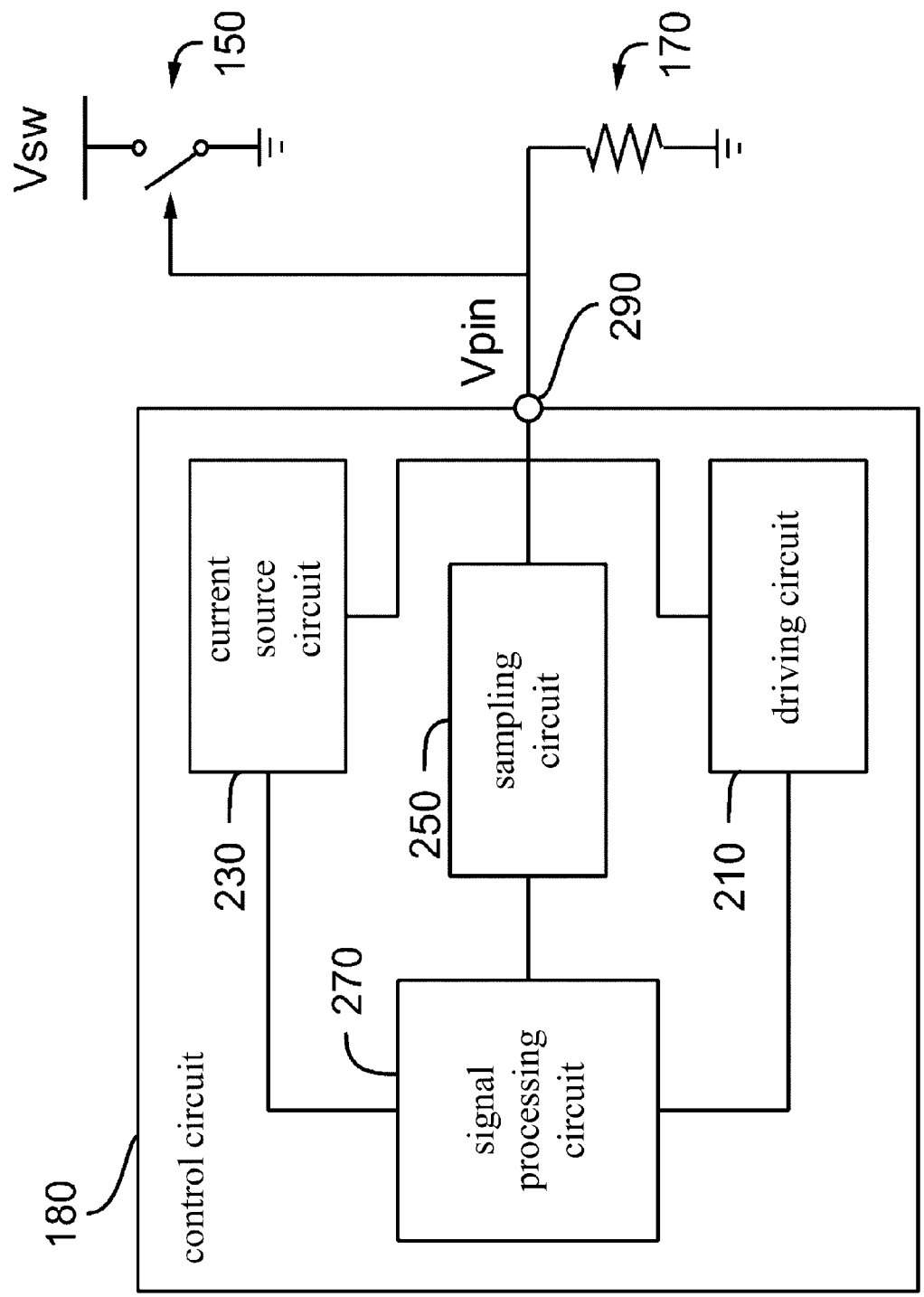
FIG. 2 shows a simplified functional block diagram of an example control circuit in FIG. 1.

FIG. 2 shows a simplified functional block diagram of an example control circuit 180 in FIG. 1. The control circuit 180 comprises a driving circuit 210, a current source circuit 230, a sampling circuit 250, a signal processing circuit 270, and shared pin 290. In this embodiment, the shared pin 290 of the control circuit 180 is coupled with the control terminal of the switch 150 and the resistor 170.

The driving circuit 210 may be coupled with the control terminal of the switch 150 through the shared pin 290 to configure the conduction status of the switch 150 so that the power converter 100 may generate the required DC signal Vout. In this embodiment, the driving circuit 210 may generate the pulse width modulation signal to intermittently conduct the switch 150 at appropriate time. In other embodiments, the driving circuit 210 may be realized with a tristate driving circuit so that the signal processing circuit 270 may configure the driving circuit 210 to be in the operation state for configuring the conduction status of the switch 150 or to be in the high impedance state.

The current source circuit 230 may be realized with any suitable circuit structures to provide the required current. For example, the current source circuit 230 may be realized with a current mirror circuit. The current source circuit 230 is coupled with the resistor 170 through the shared pin 290 to provide the current to the resistor 170 for generating a voltage corresponding to the resistance of the resistor 170.

The sampling circuit 250 is coupled with the shared pin 290 to sample the voltage on the shared pin 290. The sampling values are transmitted to the signal processing circuit 270 for further processing. The sampling circuit 250 may be realized with the analog-to-digital converter or other suitable circuit structures.

The signal processing circuit 270 receives the sampling values transmitted from the sampling circuit 250, and configures the operation parameter(s) of the power converter 100 according to the sampling value(s) or the computation value(s) calculated according to the sampling value(s). For example, the signal processing circuit 270 may configure the operation parameters of the power converter 100 or the operation parameters of the components in the power converter 100. In this embodiment, the signal processing circuit 270 receives a plurality of sampling values provided by the sampling circuit 250 and compares these sampling values to minimize the influence of the noise when the sampling circuit 250 samples signals on the shared pin 290. When the difference(s) between two or more consecutive sampling values are less than a predetermined value (e.g., two or more consecutive sampling values are equal), the signal processing circuit 270 configures the operation parameter(s) of the power converter 100 according to the sampling values. The signal processing circuit 270 may be realized with processors, micro controllers, digital circuits, and/or analog circuits in combination with memory units so as to store and compare a plurality of sampling values. For example, in one embodiment, the sampling values may be stored in one or more registers and compared with a comparator circuit.

Figure 3:
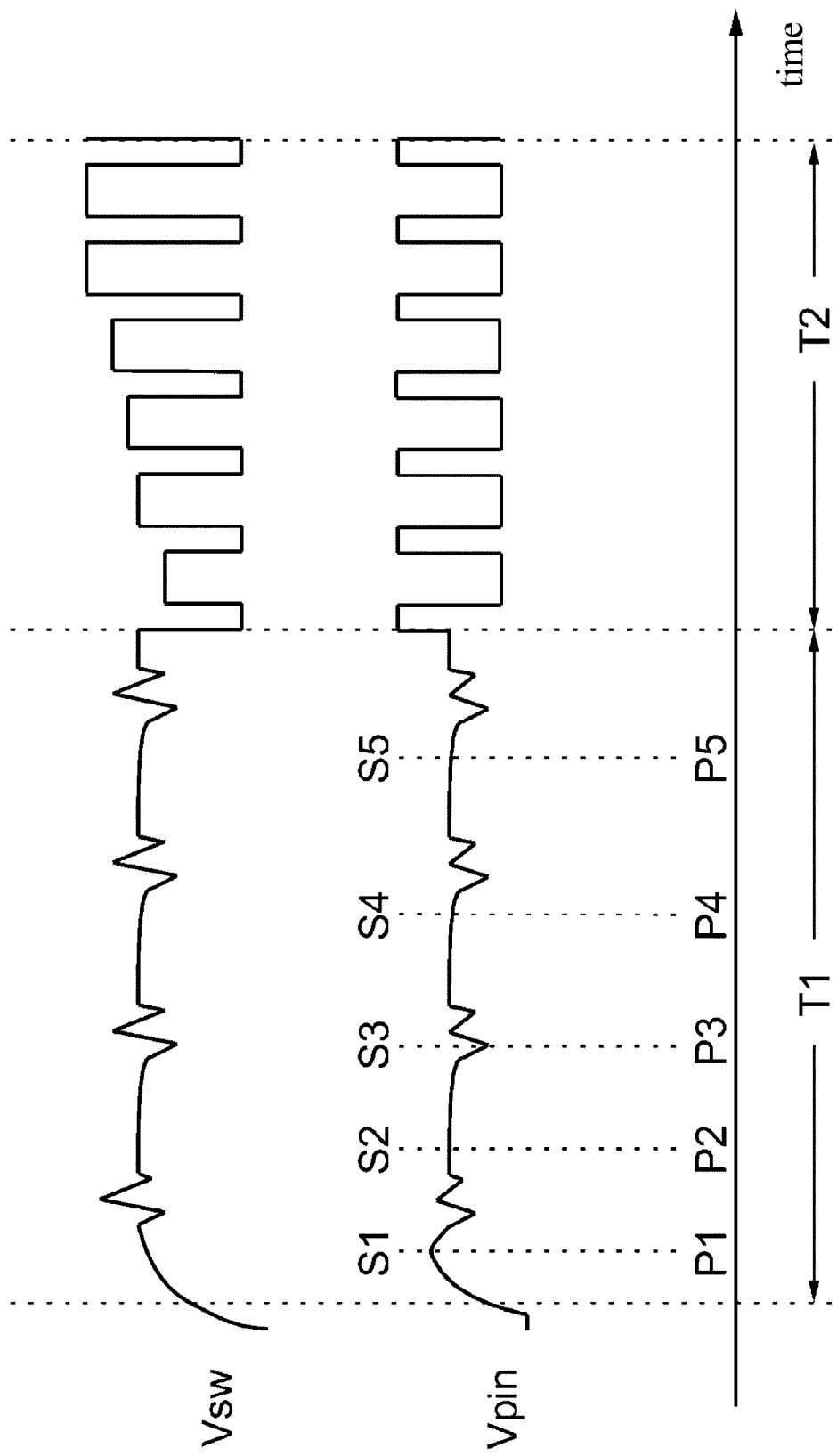
FIG. 3 shows a simplified timing diagram of example signals generated by the AC-DC power converter in FIG. 1.

FIG. 3 shows a simplified timing diagram of example signals generated by the power converter 100 in FIG. 1. The operations of the power converter 100 and the control circuit 180 are further explained below with FIG. 1~3.

In the period T1 in FIG. 3, the AC power source Vac starts to provide power and the voltage Vsw of the switch 150 increases. The current source circuit 230 provides a current to the resistor 170 through the shared pin 290 for generating the voltage Vpin on the shared pin 290.

In the period T1, the power converter 100 has not operated normally so that the signals in the power converter 100 are not stable. In this embodiment, the sampling circuit 250 samples the voltage Vpin on the shared pin 290 respectively in the intervals P1~P5 and obtain the sampling values S1~S5. Because the differences between the signals S1~S4 are not less than a predetermined value, the signal processing circuit 270 does not configure the operation parameters of the power converter 100 according to the sampling values S1~S4. When the difference between the sampling values S4 and S5 is less than the predetermined value (e.g., the sampling value S4 and S5 are equal), the signal processing circuit 270 configures the operation parameters of the power converter 100 according to the sampling value S4, the sampling value S5, and/or the computation value(s) calculated according to at least one of the sampling value S4 and the sampling value S5.

After the control circuit 180 configured the operation parameter(s) of the power converter 100, the power converter 100 operates normally for conducting the switch 150 at appropriate time in the period T2. Thus, the power converter 100 may generate the required DC signal Vout.

In the above embodiment, the sampling circuit 250 may be realized with analog circuits and/or digital circuits for sampling analog and/or digital sampling values. For example, the sampling circuit 250 may be realized with an analog sampleand-hold circuit, a sigma delta analog to digital converting circuit (ADC), a successive approximation ADC, a flash type ADC, etc.

Figure 4:
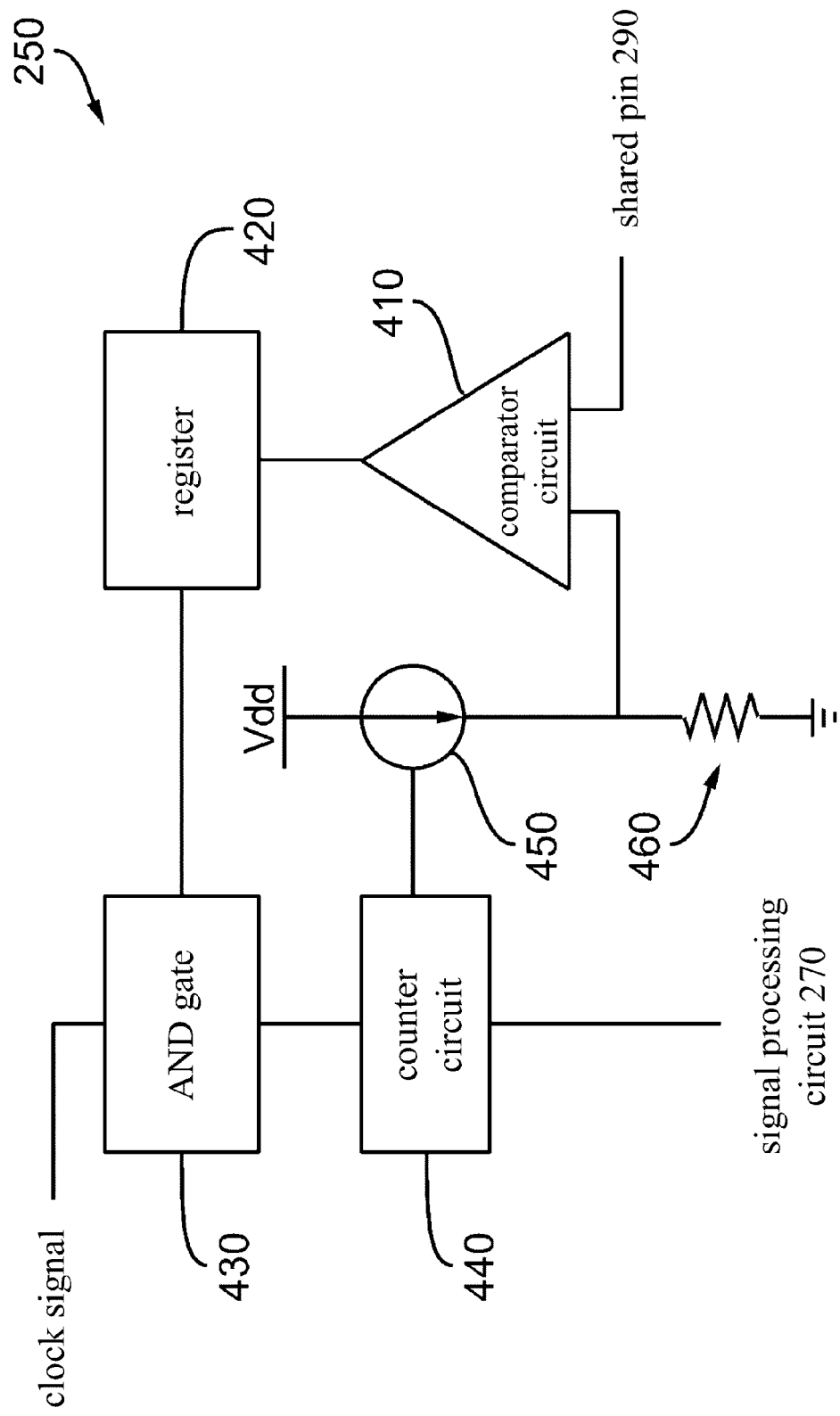
FIG. 4 shows a simplified functional block diagram of an example sampling circuit in FIG. 2.

FIG. 4 shows a simplified functional block diagram of an example sampling circuit 250 in FIG. 2. The sampling circuit 250 comprises a comparator circuit 410, a register 420, an AND gate 430, a counter circuit 440, a current source circuit 450, and a resistor 460.

In this embodiment, before the sampling circuit 250 samples the voltage Vpin on the shared pin 290, the signal processing circuit 270 resets the sampling circuit 250 to configure the content of the register 420 and the content of the counter circuit 440 to be the predetermined values (e.g., 0). The current source circuit 450 provides a current according to the output of the counter circuit 440. The current provided by the current source circuit 450 flows through the resistor 460 to generate a corresponding voltage at the input end of the comparator circuit 410.

The comparator circuit 410 compares the voltage of the resistor 460 with the voltage Vpin on the shared pin 290. In this embodiment, when the voltage on the resistor 460 and the voltage Vpin on the shared pin 290 are not equal, the comparator circuit 410 generates a non-zero value to be stored in the register 420.

The AND gate 430 performs an AND operation on a clock signal and the value stored in the register 420, and the output of the AND gate 430 is transmitted to the counter circuit 440. The counter circuit 440 accumulates the output of the AND gate 430 for configuring the output current of the current source circuit 450 and therefore configuring the voltage on the resistor 460.

In this embodiment, when the voltage on resistor 460 and the voltage Vpin on the shared pin 290 are not equal, the output of comparator circuit 410 is not zero so that the output of the register 420 is not zero. The counter circuit 440 accumulates the output of the AND gate 430 for configuring the output current of the current source circuit 450. When the voltage on the resistor 460 and the voltage Vpin on the shared pin 290 are equal, the output of the comparator circuit 410 is zero so that the output of register 420 is zero. The output of the counter circuit 440 maintains the same value so that the output current of the current source circuit 450 and the voltage on the resistor 460 maintain the same. In one embodiment, the output of the counter circuit 440 may also be used as the digital representation of the voltage Vpin on the shared pin 290, and the signal processing circuit 270 may perform further calculation accordingly.

Figure 5:
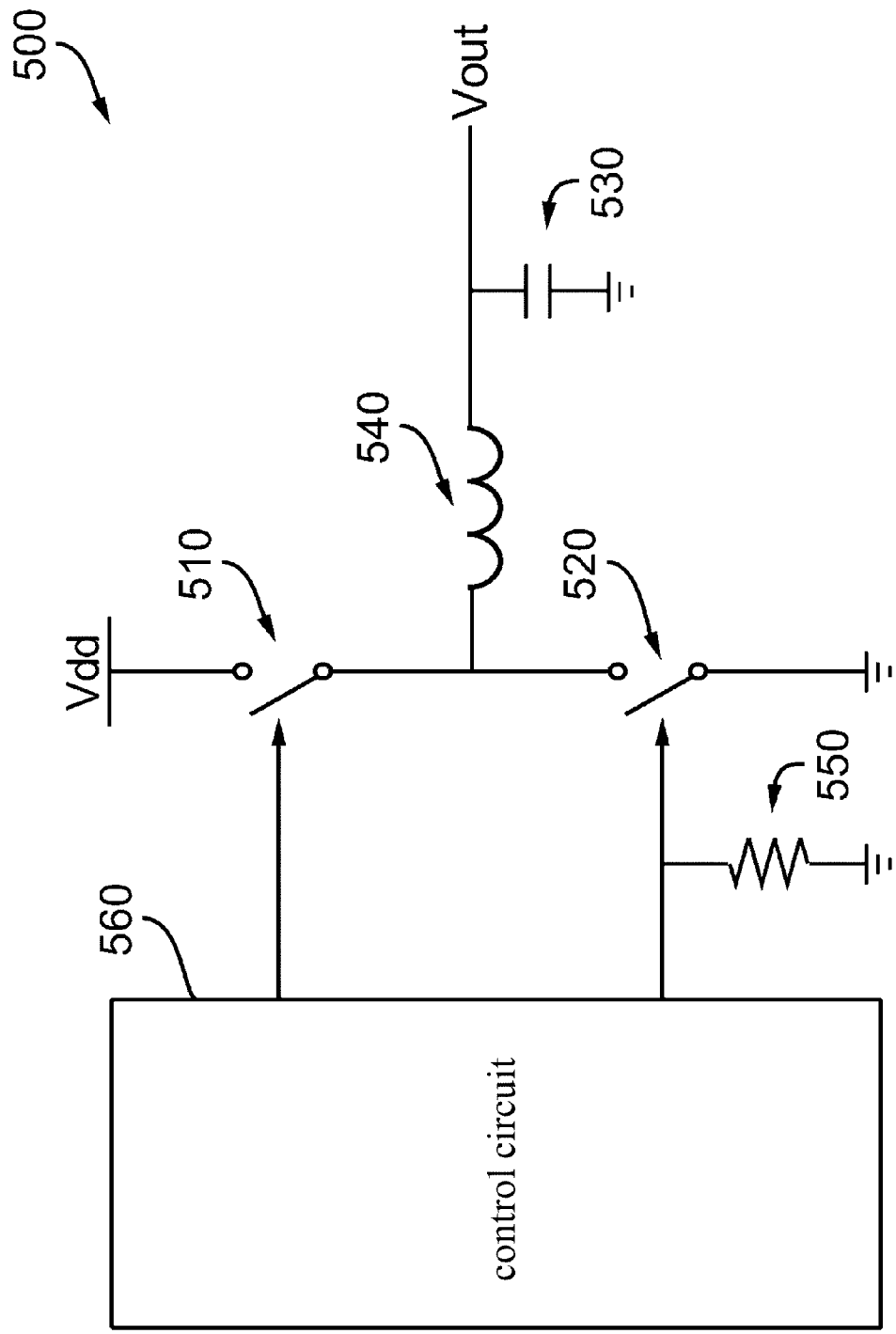
FIG. 5 shows a simplified functional block diagram of an example DC-DC power converter.

In the above embodiments, the power converter 100 is configured as a boost type power converter. In other embodiments, the power converter 100 may also be configured as a buck type power converter or a buck-boost power converter. Moreover, the above embodiments may also be utilized in the DC to DC power converter. For example, FIG. 5 shows a simplified functional block diagram of an example DC to DC power converter 500. The power converter 500 is a buck type power converter, comprising switches 510 and 520, a capacitor 530, an inductor 540, a resistor 550, and a control circuit 560. Some components and connections are simplified or omitted in FIG. 5 for the purpose of conciseness and clear explanation.

The control circuit 560 configures the conduction statuses of the switches 510 and 520 so that the output voltage Vout of the power converter 500 may be configured to be less than or equal to the voltage Vdd. Moreover, the control circuit 560 may be realized to be the same as or similar to the control circuit 180 so as to configures the operation parameter(s) of the power converter 500 according to the resistance of the resistor 550. For example, the control circuit 560 may configure the overcurrent protection value of the power converter 500 according to the resistance of the resistor 550.

Figure 6:
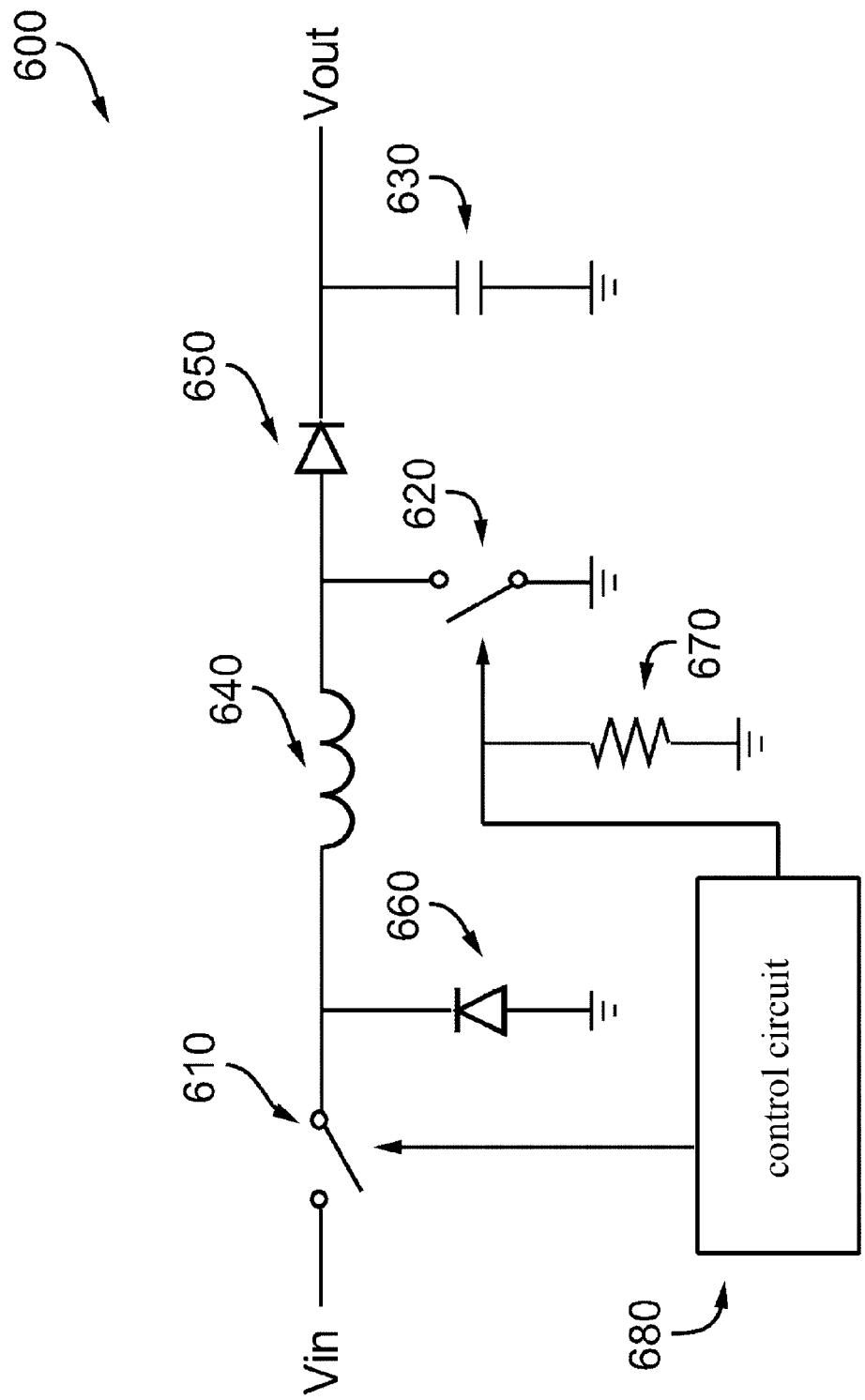
FIG. 6 shows a simplified functional block diagram of another example DC-DC power converter.

FIG. 6 shows a simplified functional block diagram of another example DC-DC power converter 600. The power converter 600 is a buck-boost type power converter, comprising switches 610 and 620, a capacitor 630, an inductor 640, diodes 650 and 660, a resistor 670, and a control circuit 680. Some components and connections are simplified or omitted in FIG. 6 for the purpose of conciseness and clear explanation.

The control circuit 680 configures the conduction statuses of the switches 610 and 620 so that the output voltage Vout of the power converter 600 may be configured to be greater than, equal to, or less than the input voltage Vin. Moreover, the control circuit 680 may be realized to be the same as or similar to the control circuit 180 so as to configures the operation parameter(s) of the power converter 600 according to the resistance of the resistor 670. For example, the control circuit 680 may configure the overcurrent protection value of the power converter 600 according to the resistance of the resistor 670.

In the timing diagram in FIG. 3, the waveform of the voltage Vpin on the shared pin 290 may be illustrated in an exaggerated manner for clearly explain that the above embodiments may operate normally when there are noises on the shared pin 290.

In other embodiments, the resistor 170 may be realized with one or more impedance components and/or one or more active circuit components.

In other embodiments, the signal processing circuit 270 may be configured to compare two or more inconsecutive sampling values. When the difference(s) between the compared sampling values are less than a predetermined value (e.g., the compared sampling values are equal), the signal processing value 270 configures the operation parameter(s) according to the sampling value(s).

In other embodiments, the signal processing circuit 270 may also adopt other comparing algorithms to ensure the correctness of the sampling values of the sampling circuit 250. For example, the signal processing circuit 270 receives the sampling values provided by the sampling circuit 250 and configures the operation parameter(s) according to the sampling value sampled for the most times in a predetermined time period.

In other embodiments, the signal processing circuit 270 may configure the sampling time of the sampling circuit 250 according to the property of the AC power source Vac. For example, in one embodiment, the frequency of the AC signal is 60 Hz. When the AC signal flows through the bridge rectifier 110 and other components in the power converter 100, the voltage Vpin on the shared pin 290 is more stable in a period of $1/(2*60)$ seconds. Accordingly, the signal processing circuit 270 may configure the sampling frequency of the sampling circuit 250 to prevent from sampling the voltage Vpin in the unstable period. For example, the sampling frequency of the sampling circuit 250 is configured to be multiples of 60 Hz so as to sample multiple times in a period of $1/(2*60)$ seconds. In other embodiments, the sampling frequency of the sampling circuit 250 may be configured to be greater, equal to, or less than the frequency of the AC power source Vac. Moreover, the sampling circuit 250 may adopt other techniques to accurately sample the voltage Vpin.

The above embodiments may be utilized in the boost type, the buck type, and the buck-boost type AC-DC power converter, DC-DC power converter, and other types of the power converter with suitable modification. Therefore, the driving circuit and other circuit block may share the same pin on the integrated circuit package. When the required pin number of the integrated circuit package is reduced, a smaller package size may be chosen to receive the integrated circuit of the control circuit and/or other circuit components. The dimensions of the integrated circuit package and the electronic devices may be effectively reduced, and the environmental protection purpose may be better achieved.

In the above embodiment, the control circuit samples and compares the sampling values for multiple times. The control circuit may still obtain the correct sampling value to configure the operation parameter(s) even when there are noises on the shared pin. After the control circuit configures the operation parameter(s) according to the correct sampling value(s) and the power converter may operation in the correct operation mode, the control circuit starts to conduct the switch so as to ensure the functionality of the power converter.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A control circuit for a power converter, comprising:
a shared pin, for coupling with a resistor and a switch of the power converter;
a current source circuit, coupled with the shared pin, for providing a current through the shared pin to the resistor in a first period;
a sampling circuit, coupled with the shared pin, for sampling signals on the shared pin in a first interval and a second interval of the first period for generating a first sampling value and a second sampling value;
a signal processing circuit, coupled with the sampling circuit, for comparing the first sampling value and the second sampling value; and
a driving circuit, coupled with the shared pin, for generating a driving signal to configure a conduction status of the switch through the shared pin;
wherein the signal processing circuit configures the driving circuit to intermittently conduct the switch in a second period when a difference between the first sampling value and the second sampling value is less than a predetermined value.

2. The control circuit of claim 1, wherein the signal processing device configures one or more operation parameters of the power converter according to at least one of the first sampling value, the second sampling value, a first computation value calculated according to the first sampling value, and a second computation value calculated according to the second sampling value.

3. The control circuit of claim 1, wherein the driving circuit does not generate the driving signal in the first period.

4. The control circuit of claim 3, wherein the driving signal generated by the driving circuit in the second period is a pulse width modulation signal; and the switch is intermittently driven to conduct when the driving signal is transmitted to a control terminal of the switch.

5. The control circuit of claim 4, wherein the shared pin is used for coupling with the control terminal of the switch.

6. A control method for a power converter, comprising:
coupling a shared pin with a switch and a resistor of the power converter;
providing a current through the shared pin to the resistor in a first period;
sampling signals on the shared pin in a first interval and a second interval of the first period to generate a first sampling value and a second sampling value;
comparing the first sampling value and the second sampling value; and
configuring the switch to be conductive intermittently through the shared pin in a second period when a difference between the first sampling value and the second sampling value is less than a predetermined value.

7. The control method of claim 6, further comprising:
configuring one or more operating parameters of the power converter according to at least one of a sampling value sampled on the shared pin and a computation value calculated according to the sampling value.

8. The control method of claim 6, wherein the switch is not driven to conduct in the first period.

9. The control method of claim 8, wherein the switch is intermittently driven to conduct with a pulse width modulation signal in the second period.

10. The control method of claim 9, wherein the shared pin is coupled with a control terminal of the switch.

* * * * *